(12) United States Patent (10) Patent No.: US 8,739,546 B2
Snyder et al. (45) Date of Patent: Jun. 3, 2014

(54) GAS TURBINE COMBUSTOR WITH QUENCH WAKE CONTROL

(75) Inventors: Timothy S. Snyder, Glastonbury, CT (US); Won-Wook Kim, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1368 days.

(21) Appl. No.: 12/550,845

(22) Filed: Aug. 31, 2009

(65) Prior Publication Data

US 2011/0048024 A1 Mar. 3, 2011

(51) Int. Cl.
*F02C 1/00* (2006.01)
*F02G 3/00* (2006.01)

(52) U.S. Cl.
USPC .................................. 60/752; 60/754; 60/755

(58) Field of Classification Search
USPC ........... 60/752–760, 737, 740, 746, 747, 748, 60/732, 733, 722
See application file for complete search history.

(56) References Cited

U.S. PATENT DOCUMENTS

| | | | |
|---|---|---|---|
| 5,435,139 A | 7/1995 | Pidcock et al. | |
| 5,628,192 A | 5/1997 | Hayes-Bradley et al. | |
| 5,640,851 A | 6/1997 | Toon et al. | |
| 5,758,503 A | 6/1998 | DuBell et al. | |
| 5,782,294 A | 7/1998 | Froemming et al. | |
| 5,797,267 A | 8/1998 | Richards | |
| 5,934,067 A | 8/1999 | Ansart et al. | |
| 5,983,642 A | 11/1999 | Parker et al. | |
| 6,047,539 A | 4/2000 | Farmer | |
| 6,070,412 A | 6/2000 | Ansart et al. | |
| 6,182,451 B1 | 2/2001 | Hadder | |
| 6,189,814 B1 | 2/2001 | Richards | |
| 6,240,731 B1 | 6/2001 | Hoke et al. | |
| 6,378,286 B2 | 4/2002 | Vermes et al. | |
| 6,470,685 B2 | 10/2002 | Pidcock et al. | |
| 6,474,070 B1 * | 11/2002 | Danis et al. ..................... | 60/739 |
| 6,571,566 B1 | 6/2003 | Temple et al. | |
| 6,606,861 B2 | 8/2003 | Snyder | |
| 6,655,146 B2 * | 12/2003 | Kutter et al. ..................... | 60/752 |
| 6,701,714 B2 | 3/2004 | Burd et al. | |
| 6,715,292 B1 * | 4/2004 | Hoke .............................. | 60/748 |
| 6,763,664 B2 | 7/2004 | Aoyama | |
| 6,810,673 B2 | 11/2004 | Snyder | |
| 7,093,439 B2 | 8/2006 | Pacheco-Tougas et al. | |
| 7,093,441 B2 | 8/2006 | Burd et al. | |

(Continued)

FOREIGN PATENT DOCUMENTS

WO WO-2008127437 A2 10/2008

*Primary Examiner* — William H Rodriguez
(74) *Attorney, Agent, or Firm* — Miller, Matthias & Hull LLP

(57) ABSTRACT

A gas turbine engine has a combustor module including an annular combustor having a liner assembly that defines an annular combustion chamber and includes a circumferential row of a plurality of relatively large combustion dilution air admission holes and a circumferential row of a plurality of smaller quench air admission holes disposed downstream with respect to the flow of combustion gas products. The plurality of quench air admission holes are arranged with respect to the plurality of relatively large dilution air admission holes disposed upstream thereof such that there is associated with each dilution air admission hole a first quench air admission hole and a second quench air hole, the first quench air hole being offset laterally in a first lateral direction and the second quench air hole being offset laterally in a second lateral direction opposite to the first direction.

20 Claims, 5 Drawing Sheets

(56) References Cited

U.S. PATENT DOCUMENTS

| | | |
|---|---|---|
| 7,905,094 B2 * | 3/2011 | Dudebout et al. .............. 60/752 |
| 7,926,284 B2 * | 4/2011 | Zupanc et al. .................. 60/754 |
| 8,127,554 B2 * | 3/2012 | Zupanc et al. .................. 60/754 |
| 8,141,365 B2 * | 3/2012 | Bronson et al. ................. 60/754 |
| 8,171,740 B2 * | 5/2012 | Bronson et al. ................. 60/804 |
| 2002/0116929 A1 | 8/2002 | Snyder |
| 2003/0061817 A1 | 4/2003 | Aoyama |
| 2003/0101731 A1 | 6/2003 | Burd et al. |
| 2003/0167771 A1 | 9/2003 | Hayashi et al. |
| 2003/0213250 A1 | 11/2003 | Pacheco-Tougas et al. |
| 2003/0233832 A1 | 12/2003 | Martling et al. |
| 2004/0006995 A1 | 1/2004 | Snyder |
| 2004/0226299 A1 | 11/2004 | Drnevich |
| 2004/0231333 A1 | 11/2004 | Tiemann |
| 2005/0022531 A1 | 2/2005 | Burd |
| 2005/0086940 A1 | 4/2005 | Coughlan et al. |
| 2005/0086944 A1 | 4/2005 | Cowan |
| 2007/0193248 A1 * | 8/2007 | Bessagnet et al. ........... 60/39.01 |
| 2008/0127651 A1 * | 6/2008 | Zupanc et al. .................. 60/752 |
| 2010/0095679 A1 * | 4/2010 | Rudrapatna et al. ............ 60/752 |
| 2011/0023495 A1 * | 2/2011 | Bronson et al. ................. 60/752 |

* cited by examiner

GAS TURBINE COMBUSTOR WITH QUENCH WAKE CONTROL

FIELD OF THE INVENTION

This invention relates in general to gas turbine engines and, more particularly, to quench wake control for improved temperature uniformity in the exit gas flow from a gas turbine engine combustor.

BACKGROUND OF THE INVENTION

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. In aircraft engine applications, the compressor, combustor and turbine are disposed about a central engine axis with the compressor disposed axially upstream of the combustor and the turbine disposed axially downstream of the combustor. An exemplary combustor features an annular combustion chamber defined between a radially inward liner and radially outward shell extending aft from a forward bulkhead. The radially inward liner forms a heat shield. The radially outward shell extends circumferentially about and is radially spaced from the inward liner. Arrays of circumferentially distributed combustion air holes penetrate the outward shell and the inward liner at multiple axial locations to admit combustion air into the combustion chamber along the length of the combustion chamber. A plurality of circumferentially distributed fuel injectors and associated swirlers or air passages are mounted in the forward bulkhead. The fuel injectors project into the forward end of the combustion chamber to supply the fuel. The swirlers impart a swirl to inlet air entering the forward end of the combustion chamber at the bulkhead to provide rapid mixing of the fuel and inlet air. Commonly assigned U.S. Pat. Nos. 7,093,441; 6,606,861 and 6,810,673, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. A combustor configured for RQL combustion includes three serially arranged combustion zones: a fuel-rich combustion zone at the forward end of the combustor, a quench or dilution zone that involves the conversion of rich combustion to lean combustion, and a lean combustion zone axially aft of the quench or dilution zone. Thus, the combustion process in a combustor configured for RQL combustion has two governing states of combustion: a first state in the forward portion of the combustor that is stoichiometrically fuel-rich and a second state in a downstream portion of the combustor that is stoichiometrically fuel-lean.

During engine operation with RQL combustion, a portion of the pressurized air discharged from the compressor is directed through a diffuser to enter the combustion chamber through the inlet air swirlers to support rich-burn combustion. Concurrently, the fuel injectors introduce a stoichiometrically excessive quantity of fuel into the front portion of the combustor. The resulting stoichiometrically rich fuel-air mixture is ignited and burned to partially release the energy content of the fuel. The fuel rich character of the mixture inhibits NOx formation in the rich burn zone by suppressing the combustion flame temperature. It also resists blowout of the combustion flame during certain operating conditions or any abrupt transients to engine power and promotes good ignition of the combustor.

The fuel rich combustion products generated in the first zone of combustion propagate downstream where the combustion process continues. Pressurized air from the compressor enters the combustion chamber radially through a row of circumferentially spaced dilution air admission holes. The additional air admitted through these dilution air holes mixes with the combustion products from the first zone to support further combustion and release additional energy from the fuel. The air also progressively deriches the fuel rich combustion gases as these gases flow axially through and mix with the air introduced in the quench region. Initially, with the dilution air addition, the fuel-air ratio of the combustion products becomes less fuel rich approaching a stoichiometric composition, causing an attendant rise in the combustion flame temperature. Since the quantity of NOx produced in a given time interval increases exponentially with flame temperature, significant quantities of NOx can be produced during the initial quench process where the combustion is rich. As quenching continues, the fuel-air ratio of the combustion products rapidly convert through the stoichiometric state to become fuel lean, causing an attendant reduction in the flame temperature. However, until the mixture is diluted to a fuel-air ratio substantially lower than stoichiometric, the flame temperature remains high enough to generate appreciable quantities of NOx.

For example, the aforementioned commonly assigned U.S. Pat. No. 6,810,673, discloses an embodiment of a annular gas turbine combustor having a single row of corresponding positioned major dilution air admission holes in the inner shell and inner heat shield forming the inner liner and a single row of corresponding positioned major dilution air admission holes in the outer shell and outer heat shield forming the outer liner. These major dilution air admission holes are positioned axially whereby the dilution air is admitted therethrough into the combustor at the forward end of the quench zone. The major holes in the outer shell and outer heat shield are disposed in axial alignment with the major holes in the inner shell and the inner heat shield, but at circumferentially offset intervals therewith. In another embodiment, the single row of major holes in the outer liner further includes a set of smaller diameter minor air admission holes disposed in the single row of air admission holes circumferentially spaced intervals intermediate neighboring pairs the large diameter major air admission holes. In this embodiment, the single row of major holes in the inner liner may further include a set of smaller diameter minor air admission holes disposed in the single row of air admission holes circumferentially spaced intervals intermediate neighboring pairs the large diameter major air admission holes.

U.S. Pat. No. 5,934,067 discloses an embodiment of a gas turbine engine combustor bounded by axially extending inner and outer annular walls connected by an end wall including a plurality of fuel injectors disposed at circumferentially spaced intervals. In each of the inner and outer annular walls includes a first row of circumferentially spaced larger diameter air admission orifices in an upstream transversely extending plane and a second row of circumferentially spaced smaller diameter air admission orifices in a downstream transversely extending plane. The number of larger diameter holes in each of the upstream rows of larger diameter orifices in the inner and outer walls are equal in number to the number of fuel injectors and are arranged so that the large diameter orifices in the outer wall are displaced to one side of the centerline of the fuel injectors and the large diameter orifices in the inner wall are displaced to the opposite side of the centerline of the fuel injectors such that the air passing through the large diameter orifices flows counter to the swirling direction of the fuel injectors. The smaller diameter orifices are also equal in number to the number of fuel injection nozzles. In an embodiment, the respective rows of smaller diameter orifices are offset axially from the respective rows of the larger diameter orifices by an amount between one-half the diameter of the larger diameter orifice and one-half the diameter of the smaller diameter orifices.

U.S. Pat. No. 6,070,412 discloses an embodiment of a gas turbine engine combustor bounded by axially extending inner and outer annular walls connected by an end wall including two circumferential rows of fuel injectors, each row of fuel injectors including a set of N fuel injectors. Each of the inner and outer walls includes a row of circumferentially uniformly distributed primary air admission holes disposed in an upstream transverse plane extending perpendicular to the axis of symmetry. Each of the inner and outer walls includes row of circumferentially uniformly distributed dilution air admission holes disposed in a downstream transverse plane perpendicular to the axis of symmetry. The number of primary air holes in the upstream row in each of the inner and outer walls is equal to twice the number of fuel injectors in each row of fuel injectors. The number of dilution air holes in the downstream row in each of the inner and outer walls is equal to twice the number of primary air holes in the upstream row of the holes. The distance separating the upstream row of air holes and the downstream row of air holes in the outer wall is shorter than the distance between two consecutive primary air admission holes in the outer wall. The distance separating the upstream row of air holes and the downstream row of air holes in the inner wall is shorter than the distance between two consecutive holes in the upstream row of holes in the inner wall.

Finally, the deriched combustion products after quench flow axially into the downstream of the combustor where the combustion process concludes as lean-burn combustion. Additional jets of compressor discharge air may be admitted radially into the lean burn zone. The additional air supports ongoing combustion to complete combustion of the fuel and to reduce the peak temperature, as well as regulate the spatial temperature profile of the combustion products prior to entering the turbine. Regulation of the peak temperature and temperature profile protects the turbine from exposure to excessive temperatures and excessive temperature gradients.

High-temperature zones of localized, near-stoichiometric combustion conditions, commonly called hot spots, can occur despite the fuel-rich nature of the forward portion and the fuel-lean nature of the aft portion of a RQL combustion chamber. It is desirable to quickly quench hot spots, not only to reduce NOx production, but also to reduce temperature variation in the combustor exit gases so as to provide a relatively uniform temperature profile in the combustion gases exiting the combustor to enter the turbine of the engine.

SUMMARY OF THE INVENTION

Quench air is admitted through relatively small quench air holes disposed at strategically selected locations relative to the relatively large combustion dilution air admission holes in the outer and/or inner liners such the quench air is introduced directly into hot spot "wakes" formed downstream of the dilution air admission holes. Quench air may also be introduced directly into areas of "hot streaks" that may extend downstream between relatively widely spaced dilution air admission holes.

A plurality of quench air admission holes are arranged in a circumferential row disposed downstream of the plurality of first dilution air admission holes and offset circumferentially from the plurality of first dilution air admission holes disposed upstream thereof. The plurality of quench air admission holes are arranged with respect to the plurality of first dilution air admission holes disposed upstream thereof such that there is associated with each first dilution air admission hole a first quench air admission hole and a second quench air admission hole, the first quench air admission hole being offset laterally from said associated first dilution air admission hole in a first lateral direction by a first circumferential distance and the second quench air admission hole being offset laterally from said associated first dilution air admission hole in a second lateral direction opposite to the first direction by a second circumferential distance. The first circumferential distance and the second circumferential distance may be the same. Each quench air admission hole defines an opening having a flow area that is smaller than the flow area of the opening defined by the larger first dilution air admission holes.

In an embodiment, the plurality of dilution air admission holes formed in the inner and outer liners comprise a plurality of circular holes having a relatively larger diameter, $D_L$, and the plurality of quench air admission holes comprise a plurality of circular holes having a smaller diameter, $D_Q$, being about ⅓ of the first diameter, $D_L$. The circumferential row of quench air admission holes may be disposed axially downstream of the circumferential row of circular dilution air admission holes by a distance, $S_A$, ranging from about one-half the first diameter, $D_L$, up to about one times the larger diameter, $D_L$. The first quench air admission hole may be laterally offset from the associated circular dilution air admission and the second quench air admission hole may be laterally offset from the associated circular dilution air admission an equal distance ranging from about 0.7 to 1.0 times the diameter, $D_L$, of the larger diameter circular dilution air admission holes.

In an embodiment, each of the plurality of dilution air admission holes formed in at least one of the first and second annular liners comprise a plurality of axially elongated generally elliptical holes having a lateral axis, $D_L$, and an axial axis, $D_A$, and the plurality of quench air holes comprises a plurality of circular holes having a second diameter, the second diameter, $D_Q$, having a magnitude lying in the range from about 0.25 to about 0.40 of the lateral axis, $D_L$. The circumferential row of quench air admission holes may be disposed axially downstream of the circumferential row of relatively large dilution elliptical dilution air admission holes by a center-to-center spacing, $S_A$, ranging from about 0.7 to about 1.0 times the axial axis $D_A$ of the relatively large elliptical dilution air admission holes. The first lateral distance by which each first quench air admission hole is offset from the associated elliptical dilution air admission and the second lateral distance by which each second quench air admission hole is offset from the associated elliptical dilution air admission hole are equal and have a magnitude lying in the range from about 0.5 to about 0.9 of the lateral axis, $D_L$, of the associated elliptical dilution air admission hole.

In an aspect of the invention, a method is provided for controlling temperature deviations in the exhaust gases exiting an annular combustion chamber defined between an inner circumferentially extending liner and an outer circumferentially extending liner spaced radially outboard of and coaxially circumscribing the inner liner, wherein combustion dilution air is admitted into the combustion chamber through a plurality of relatively large dilution air admission files disposed in a circumferentially extending row in each of the inner liner and the outer liner. The method includes the steps of: providing a plurality of relatively smaller quench air admission holes in a circumferential row in at least one of the inner and outer liners at a location downstream of the row of relatively large dilution air admission holes; arranging the plurality of relatively smaller quench air admission holes relative to the plurality of relatively large dilution air admission holes upstream thereof such that there is associated with each relatively large dilution air admission hole a first quench air admission hole and a second quench air admission hole, with the first quench air admission hole being offset laterally in a first lateral direction and the second quench air admission hole being offset laterally in a second lateral direction opposite to the first direction; and admitting quench air into the combustion chamber through said plurality of quench air admission holes.

The method may further include the step of offsetting the first quench air admission hole laterally in a first lateral direction by a first circumferential distance and offsetting the second quench air admission hole laterally in a second lateral direction opposite to the first direction by a second circumferential distance, the first circumferential distance and the second circumferential distance being equal. The method may include disposing the circumferential row of quench air admission holes axially downstream of a circumferential row of circular first dilution air admission holes having a diameter, $D_L$, by a distance, $S_A$, ranging from about one-half the lateral diameter, $D_L$, up to about one lateral dimension, $D_L$. The method may include the step of offsetting the circumferential row of quench air admission holes downstream of a circumferential row of generally elliptical first dilution air admission holes having a lateral dimension, $D_L$, by a distance, $S_A$, ranging from about 1.5 the lateral dimension, $D_L$, up to about twice the lateral dimension, $D_L$.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
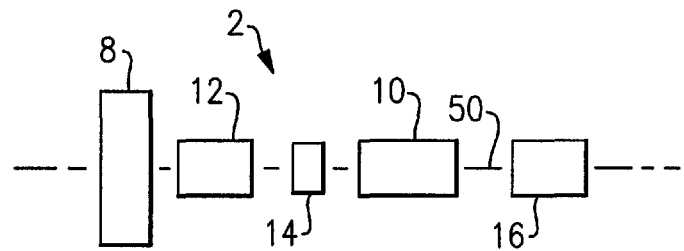
FIG. 1 is a schematic representation of a gas turbine engine.

Referring to FIG. 1, there is depicted schematically a conventional gas turbine engine 2 including a combustor module 10, a compressor 12 disposed forward, that is upstream with respect to flow, of the combustor module 10, a diffuser 14 extending from the outlet of the compressor to the forward end of the combustor module 10, and a turbine module 16 disposed aft, that is downstream with respect to flow, of the combustor module 10. The compressor, combustion module and turbine module are generally coaxially disposed about a central longitudinal axis 50 of the engine shaft which constitutes the centerline of the gas turbine engine. For a turbofan gas turbine engine, a large diameter fan 8 is mounted to the engine shaft forward of the compressor 12. Most large commercial jet liners of contemporary design use the turbofan version of the gas turbine engine to power the aircraft. It should be noted that small engines may have radial or centrifugal compressors, rather than axial compressors. Further, it is to be understood that the invention described herein is also applicable to combustors used in gas turbine jet engines that are not turbofan engines, as well as to the combustors of industrial gas turbine engines.

Figure 2:
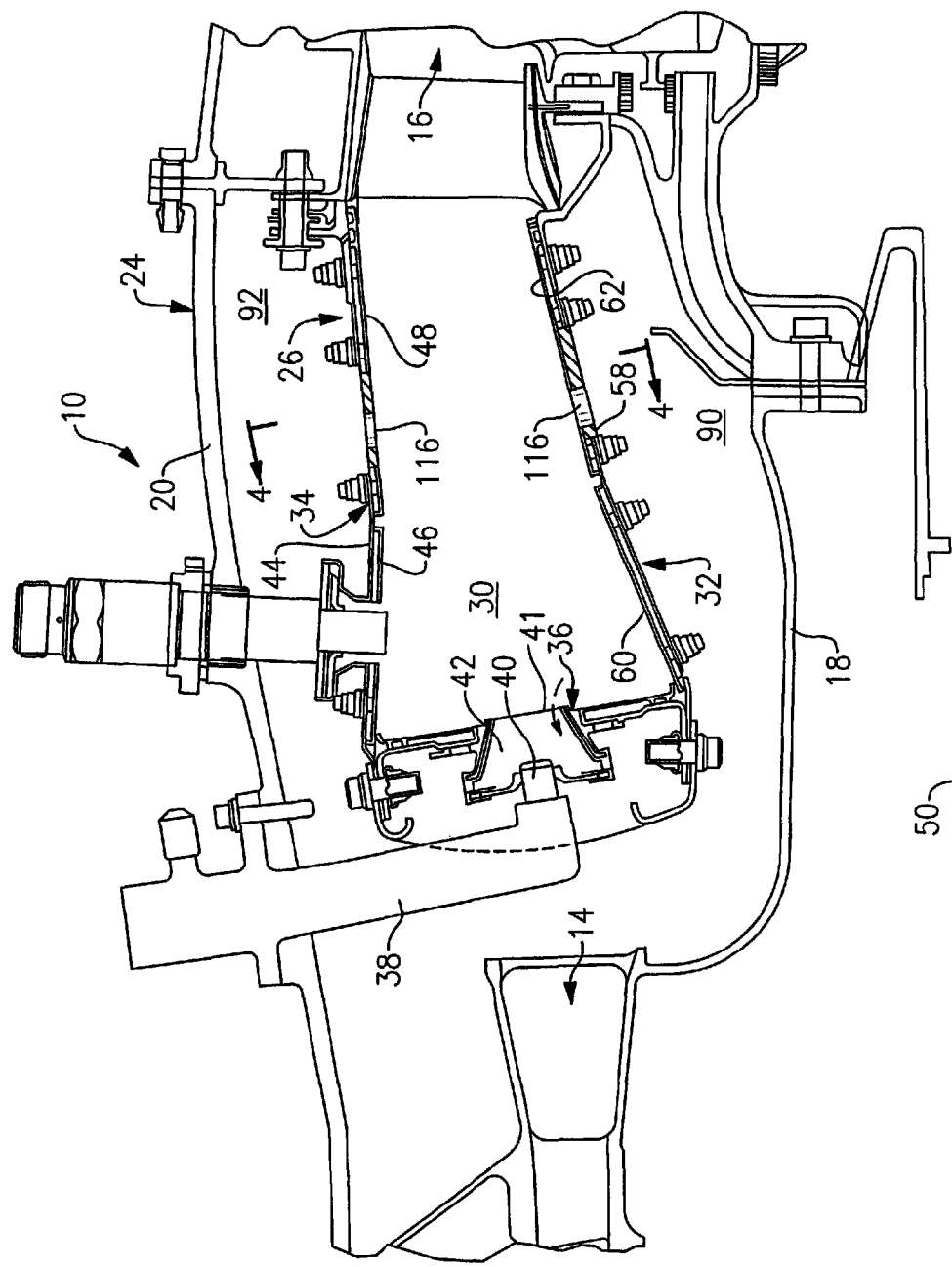
FIG. 2 is a cross-sectional side elevation view of an annular combustor according to the present invention.

Referring now to FIG. 2, the exemplary combustor module 10 comprises a radially inner case 18 and a radially outer case 20, concentric with the inner case, which in cooperation define an annular pressure vessel 24 concentric with the engine axis 50. A combustor 26 is disposed within the annular pressure vessel 24. The liner assembly includes a radially inner liner 32, a radially outer liner 34 that circumscribes the inner liner 32, and a bulkhead 36 which extending between the respective forward ends of the inner liner 32 and the outer liner 34. Collectively, the inner liner 32, the outer liner 34 and the forward bulkhead 36 bound the annular combustion chamber 30. The combustor 26 may have a forward portion wherein the inner and outer liners converge from fore to aft and an aft portion wherein the inner and outer liner converge fore to aft more gradually than the first portion. A detailed description of a combustor of this configuration is presented in the aforementioned U.S. Pat. No. 7,093,441. However, the depicted combustor configuration is exemplary and not limiting of the invention. For example, the combustor 26 may have a forward portion wherein the inner and outer liners extend aft in parallel relationship an aft portion wherein the inner and outer liner converge fore to aft more gradually than the first portion. A detailed description of a combustor of this configuration is presented in the aforementioned U.S. Pat. No. 6,810,673, as well as in the aforementioned U.S. Pat. No. 6,606,861. In other configurations, the inner and outer liners may be parallel over the entire length of the liner assembly, or the liners may converge in a forward portion and then extend parallel in an aft portion, or the liners may converge in both the forward and aft portions at the same or different angles of convergence throughout, or the liners may assume geometrically differing in cross-section.

The forward bulkhead 36 carries a plurality of fuel nozzles 40, for example typically from 12 to 24 depending upon the size of the engine, disposed in a circumferential array at spaced intervals about the annular combustion chamber 30.

Each fuel nozzle 40 is disposed at the end of a fuel injector 38 which extends through the outer case 20 to convey fuel from an external source to the associated fuel nozzle. Each fuel nozzle 40 injects fuel through a spray head into a central stream of air emitted along the centerline of the fuel nozzle. An air passage 41, which may have a swirler 42 associated therewith as depicted in the exemplary embodiment, is operatively associated with each fuel nozzle 40. Pressurized air from the compressor is directed into the diffuser 14 into the annular plenums 90, 92 defined within the annular pressure vessel 24. A portion of this pressured air passes into the combustion chamber 30 through the air passages 41. Each swirler 42 imparts a spin to the air passing therethrough to provide rapid mixing of this air with the fuel being injected through the associated fuel nozzle 40 to promote initial combustion of the fuel in a fuel-rich state in a forward portion of the combustion chamber 30.

In the exemplary embodiment, the inner liner 32 and the outer liner 34 are structured with a support shell and associated heat shields. The outer liner 34 comprises a single piece outer support shell 44 connected to the outer case 20, and forward and aft outer heat shields 46, 48 secured by fasteners (not shown) to respective forward and aft portions of the outer shell. Similarly, the inner liner 32 comprises a single piece inner support shell 58 connected to the inner case 18, and forward and aft inner heat shields 60, 62 secured by fasteners (not shown) to respective forward and aft portions of the inner shell. The heat shields may be formed as a circumferential array of actuate panels. Exemplary liner and heat shield constructions are described and shown in commonly assigned U.S. Pat. No. 7,093,439, the entire disclosure of which is hereby incorporated herein by reference as if set forth herein. Other embodiments, including single-wall liners, are still within the spirit and scope of the invention.

Figure 3:
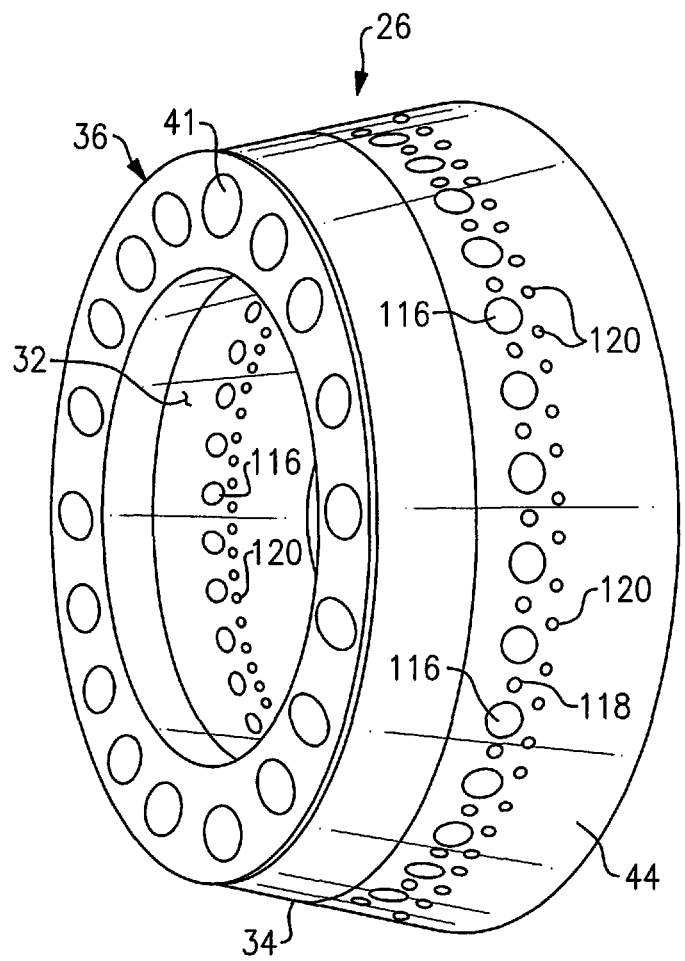
FIG. 3 is a perspective view showing an annular combustor according to an aspect of the invention.

In the exemplary embodiment depicted in FIGS. 2 and 3, each of the inner and outer liners 32, 34 has a row of circumferentially distributed combustion air admission holes penetrating through at the forward end of the aft section thereof. The row of combustion dilution air admission holes in each of the inner and outer liners 32, 34 includes at least a set of relatively larger diameter holes 116 distributed at substantially equally spaced circumferential intervals along the circumferentially extending row of combustion air admission rows. It is to be understood, however, that in other embodiments the combustion dilution air admission holes may be distributed non-uniformly along a circumferentially extending row. The row of combustion dilution air admission holes may also include a set of relatively smaller diameter holes 118 distributed circumferentially and arranged among larger diameter holes 116. In the exemplary embodiment illustrated in FIGS. 2 and 3, the outer liner 34 is provided with a circumferential row of combustion dilution air admission holes including both relatively larger diameter first dilution air admission holes 116 and relatively smaller diameter second dilution air admission holes 118, while the inner liner 32 is provided with a circumferential row of combustion dilution air holes of a uniform diameter, namely relatively larger diameter first dilution air admission holes 116. It is to be understood, however, that in other embodiments, either, both or neither of the inner and outer liners 32, 34 may have a circumferential row of combustion air admission holes that includes the relatively smaller diameter holes 118.

Each of the holes 116 in the respective support shell 44, 58 of each of the inner and outer liners 32, 34 has a corresponding hole 116 in the associated aft heat shield 48, 62. Similarly, each of the holes 118 in the support shell 58 of the outer liner 34 has a corresponding hole 118 in the associated aft heat shield 62. A plurality of axially and circumferentially distributed cooling air holes 70, 72 also perforates the inner liner 32 and the outer liner 34. These cooling air holes, depicted only in FIGS. 4 and 5, include a plurality of impingement cooling holes 70 penetrating transversely through the support shells and a plurality of film cooling holes 72 penetrating obliquely through the heat shields. The cooling air holes 70, 72 are readily distinguishable from combustion air admission holes 116, 118 because the cooling air holes are far more numerous and substantially smaller in diameter than the combustion air admission holes. During engine operation, pressurized cooling air from plenums 90, 92 enters the impingement cooling holes 70. The cooling air exits the holes 70 as a first series of discrete jets that impinge on and cool the heat shields. The impinged cooling air then flows through the film cooling holes 72, which discharge a second series of cooling air jets into the combustion chamber. Because the film cooling holes 72 are obliquely oriented, the second cooling air jets enter the combustion chamber with a directional component about the flame exposed surface of each heat shield. The jet direction and the hole packaging helps the cooling air jets coalesce into a cooling film that hugs the flame exposed surfaces of the heat shields. Exemplary sizing and arrangements of combustor air holes and cooling air holes are shown in the aforementioned U.S. Pat. Nos. 6,606,861 and 6,810,673. Other combustor hole embodiments may be used within the spirit and scope of the invention.

In the exemplary embodiment depicted in FIG. 2 of the drawing, the combustor 26 is designed to operate via a RQL combustion process. In operation, the diffuser 14 decelerates pressurized air flowing from the compressor, not shown, and directs that air into the annular plenums 90, 92 defined within the annular pressure vessel 24. As previously noted, a portion of this pressurized air enters the forward region of the combustion chamber 30 potentially through the fuel nozzles 40 and by way of the air passages 41 associated the fuel nozzles 40. Additional air enters the forward region of the combustion chamber 30 by way of cooling holes (not shown) in the forward bulkhead 36 as bulkhead cooling air. Collectively, these portions of air admitted at the forward end of the combustion chamber are referred to as primary combustion air contributors because it intermixes to a great extent with fuel introduced through the fuel nozzles 40 to support initial combustion in a fuel-rich state in the forward section of the combustion chamber. Another portion of pressurized air from the annular plenums 90, 92 enters the combustion chamber 30 through the aforementioned combustion air holes 116, 118 as combustion air for the purpose of contributing to the combustion process, diluting the combustion products and reducing hot spots within the combustion products to provide a desired spatial temperature profile across the combustion products before entering the turbine module 16.

In RQL combustion, the portion of the combustion air admitted to the combustion chamber as primary air is limited to an amount significantly less than the amount of air required for stoichiometric combustion of the fuel injected through the fuel nozzles 40. Thus, combustion in the forward section of the combustion chamber occurs, on average, under fuel rich conditions, although local variability in terms of stoichiometric combustion is likely. The overall fuel-rich stoichiometry of the fuel-air mixture in this rich burn zone produces a relatively cool flame, thus reducing excessive NOx formation and guarding against blowout of the combustion flame during any abrupt reduction in engine power or low-power operation.

The combustion products from this rich burn zone, which include unburned fuel, then enter a quench zone wherein the combustion air from plenum 90 through the aforementioned combustion dilution air admission holes 116, 118 to penetrate radially inwardly into the combustion products to dilute and derich the combustion products from their stoichiometrically rich state proximate to the forward edge of the quench zone to a stoichiometrically fuel lean state proximate to the aft edge of the quench zone. It is also important for this "dilution" air to intermix intimately with the combustion products flowing through the combustion chamber so that the fuel-air mixture quickly becomes both thoroughly blended and regularly distributed. As used herein, the term "regularly" refers to a state in which the fuel-air ratio is substantially uniform in the circumferential direction (at any arbitrarily specified radius) and in which the radial distribution of fuel-air ratio is either substantially uniform or varies in a desired, pre-established way.

The axial location of the rows of air holes 116, 118 is selected to harmonize the competing considerations of optimizing the spatial temperature profile of the combustion products and preventing excessive NOx formation in the primary combustion zone upstream of the holes 116, 118. The hole rows are positioned far enough forward to ensure that the air jets exiting therefrom have enough axial distance and ample time to adjust the temperature profile of the combustion products and achieve desired combustion efficiency before those gases enter the turbine module 16. The hole rows are also positioned far enough aft to prevent the dilution air from being entrained into the fuel-air mixture immediately aft of the fuel nozzles 40. Such entrainment would increase NOx emissions and degrade combustor blowout resistance by deriching the fuel-air mixture in the fuel rich burn zone. The circumferential distribution and axial alignment of the rows of dilution air holes 116, 118 not only mitigates NOx formation as described above, but also contributes to the peak temperature and spatial temperature profile of the exhaust gases entering the turbine module 16. In the aft section of the liner assembly, which bounds the downstream portion of the combustion chamber 30, the fuel-air mixture is fuel lean and diluted to the design point overall fuel-air ratio as the liner cooling air admitted through holes 70, 72 gradually mixes with and further dilutes the combustion products prior to the combustion products entering the turbine module 16. A more detailed description of RQL combustion in an exemplary RQL combustor is presented in the aforementioned U.S. Pat. Nos. 6,606,861 and 6,810,673.

Figure 4:
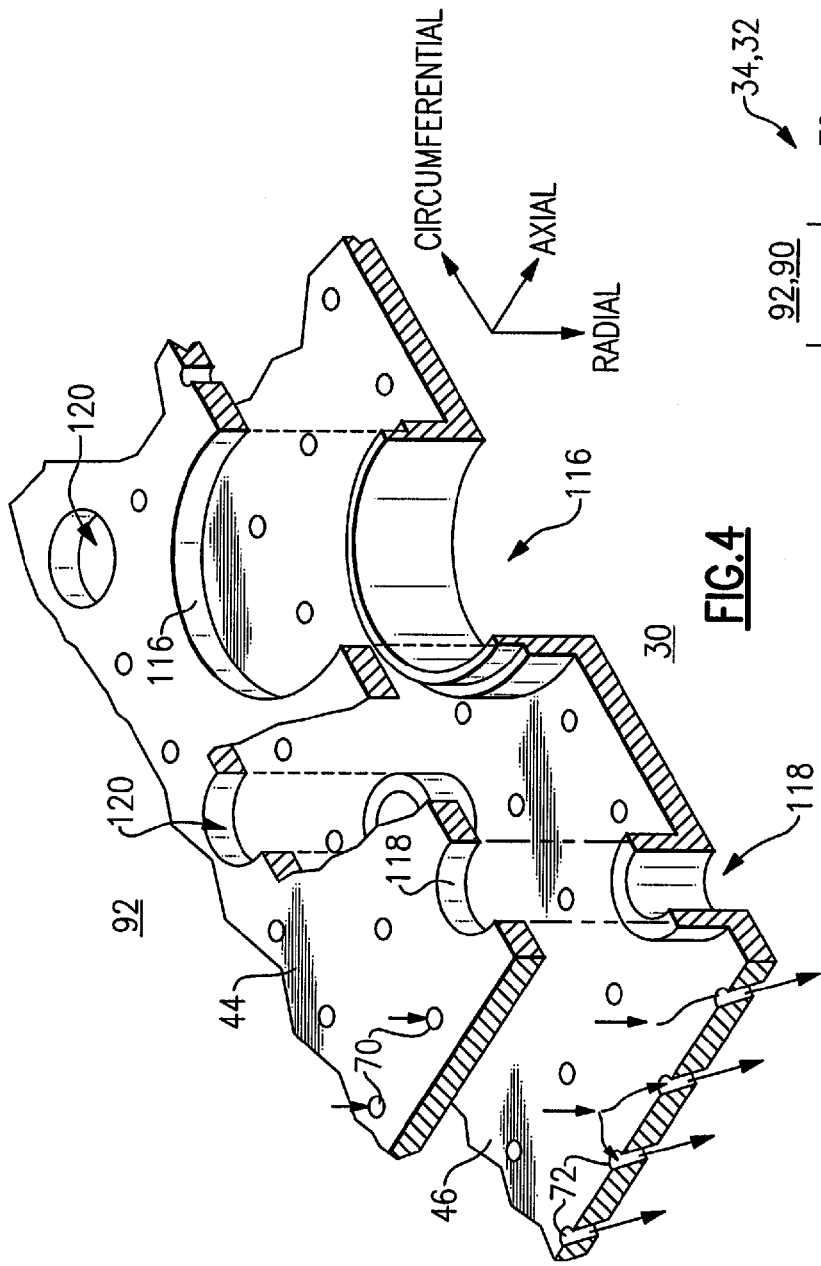
FIG. 4 is an exploded, enlarged perspective view of a portion of the combustor shown in FIG. 2.
Figure 5:
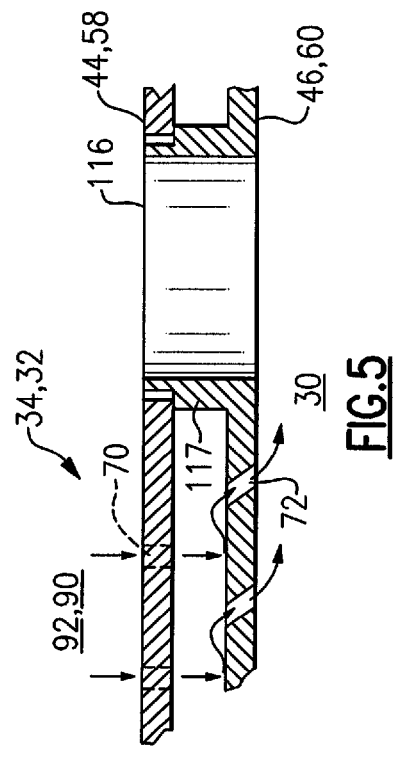
FIG. 5 is a side elevation view of a portion of the combustor shown in FIG. 4.

In the exemplary embodiment depicted in the drawing, the inner liner 32 and the outer liner 34 forming the liner assembly of the annular combustor 26 are each constructed of a circumferential array of liner panels of dual-wall construction such as shown in the afore-mentioned U.S. Pat. No. 7,093, 439. Referring to FIGS. 4 and 5, as noted previously, each of the inner liner 32 and the outer liner 34 have a support shell that supports a forward and an aft heat shield formed as a circumferential array of actuate heat shield panels. Each heat shield panel has a surface that faces the hot combustion products within the combustion chamber 30. The cooling of the heat shield panels is accomplished by passing the liner cooling air flow through the holes 72 in the heat shield panels. This liner cooling air first passes from the annular plenums 90, 92 through the holes 70 in the respective support shell, thereby cooling the support shells, into a gap 80 between the outer support shell and inner heat shield and thence through the holes 72. The aforementioned relatively low levels of liner cooling air flow are possible in part due to the dual-wall construction of the liners, which reduces the cooling flux required to cool the support shell, and by higher heat transfer efficiency.

The inventors have discovered that local high-temperature zones of localized, near-stoichiometric combustion conditions, commonly called hot spots, tend to occur in the wakes that are formed in the combustion products flow downstream and laterally of the relatively large combustion dilution air admission holes 116 as the combustion air jets admitted therethrough penetrate into the combustion air products. Additionally, areas of "hot streaks" may be formed that extend downstream between relatively widely spaced dilution air admission holes 116. The spacing of the relatively large dilution air admission holes is determined by the momentum ratio of the dilution air relative to the cross-flow or front end rich flow. Lower momentum ratios require larger dilution air admission holes and therefore result in increased spacing between holes for constant dilution flow area. The existence of such localized hot spots can lead to increase NOx production and increase temperature variation in the combustor exit gases.

In an aspect of the invention, to promote quick quenching of these hot spots, not only to reduce NOx production, but also to reduce temperature variation in the combustor exit gases so as to provide a relatively uniform temperature profile in the combustion gases exiting the combustor to enter the turbine of the engine, a row of quench air admission holes 120 are provided in one or both of the inner liner and outer liners 32, 34. Each quench air admission hole 120 defines an opening through the liner having an air flow area that is smaller than the air flow area of the openings defined by the relatively large dilution air admission holes 116. The quench air admission holes 120 are sized smaller in flow area than the relatively large diameter dilution air admission holes 116 such that the collective amount of quench air that is admitted from the common plenums 90, 92 through the quench air admission holes 120 diverts only a limited amount of combustion air from the plenums 90, 92 that would otherwise have passed from the plenum 90, 92 into the combustion chamber 30 as dilution air through the dilution air admission holes 116 thereby ensuring that the effectiveness of the dilution air in diluting and de-riching the combustion products is not adversely impacted.

Figure 6:
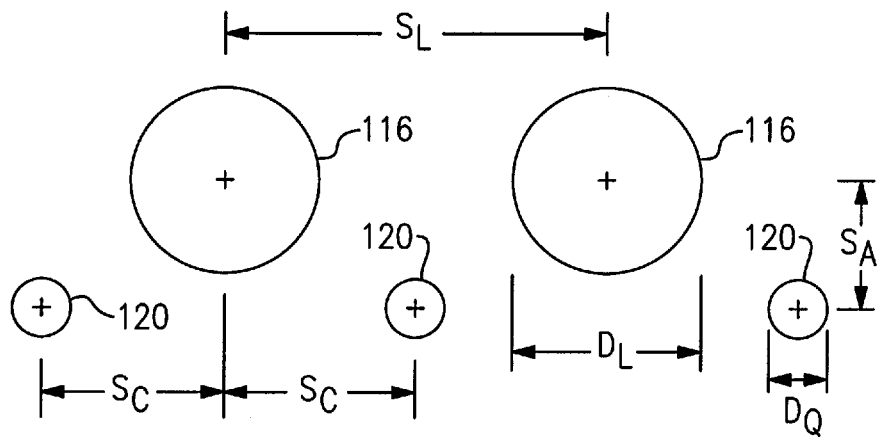
FIG. 6 is a plan layout illustration of an exemplary arrangement of a row of quench air admission holes relative to an upstream row of circular dilution air admission holes.
Figure 7:
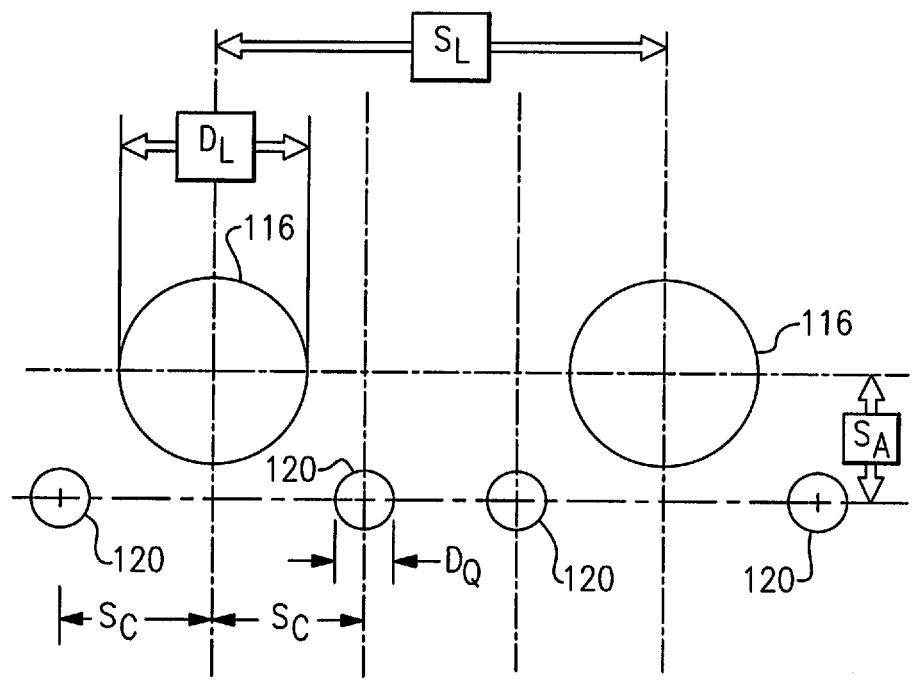
FIG. 7 is a plan layout illustration of another exemplary arrangement of a row of quench air admission holes relative to an upstream row of circular dilution air admission holes.
Figure 8:
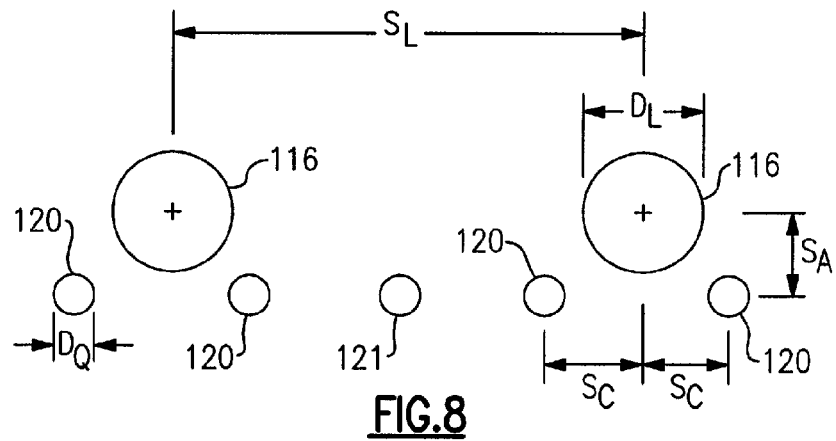
FIG. 8 is a plan layout illustration of another exemplary arrangement of a row of quench air admission holes relative to an upstream row of circular dilution air admission holes.
Figure 9:
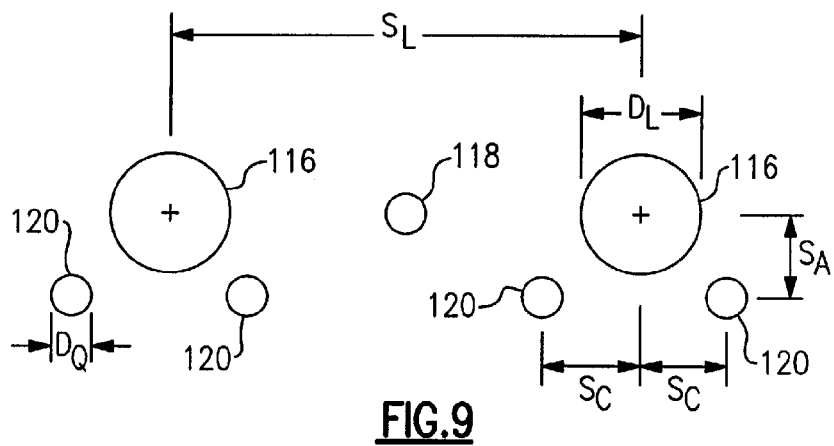
FIG. 9 is a plan layout illustration of still another exemplary arrangement of a row of quench air admission holes relative to an upstream row of circular dilution air admission holes.
Figure 10:
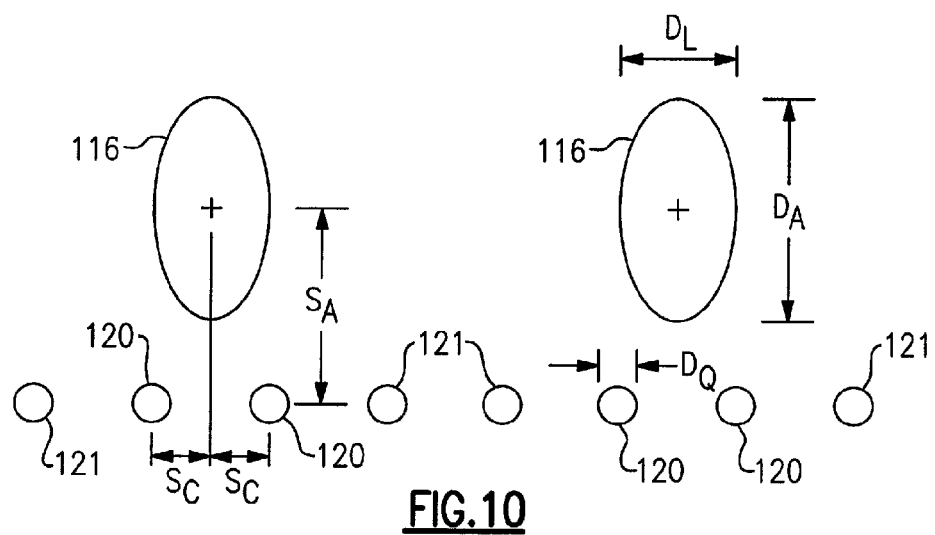
FIG. 10 is a plan layout illustration of an exemplary arrangement of a row of quench air admission holes relative to an upstream row of elliptical dilution air admission holes.

The quench air admission holes 120 are strategically located such the quench air is introduced directly into these hot spot "wakes". Referring now to FIGS. 6 and 10, the plurality of quench air admission holes 120 are arranged in a circumferential row spaced a selected distance, $S_A$, axially downstream with respect to the flow of combustion products relative to the plurality of the relatively larger dilution air admission holes 116 disposed in an upstream circumferential row. Additionally, the plurality of quench air admission holes 120 are arranged in the circumferential row so as to be offset circumferentially from the plurality of dilution air admission holes 116 disposed upstream thereof such that there is associated with each relatively larger dilution air admission hole 116, a first quench air admission hole 120 and a second quench air hole 120. The first quench air admission hole 120 is offset laterally from the associated dilution air admission hole in a first lateral direction by a first circumferential distance, $S_{C1}$, and the second quench air hole being offset laterally from said associated dilution air admission hole in a second lateral direction opposite to the first direction by a second circumferential distance, $S_{C2}$. The first circumferential distance and the second circumferential distance may generally be the same. In this arrangement, no quench air admission hole 120 is positioned in direct axial alignment behind a relatively larger dilution air admission hole 116.

In FIGS. 6-9, each of the dilution air admission holes 116 defines a circular opening having a lateral dimension, $D_L$, which, since the opening is a circular, is the diameter of the opening. In FIG. 10, each of the dilution air admission holes 116 defines a generally elliptical opening having a lateral dimension, $D_L$ that, since the opening is elliptical, is the minor axis of the opening. The relatively large dilution air admission holes 116 are spaced apart, center-to-center, in the upstream circumferential row at a substantially uniform lateral, i.e. circumferential, spacing $S_L$. In each figure, each quench air admission hole 120 defines an opening having a lateral dimension, $D_Q$. The lateral dimension, $D_Q$, of each quench air admission hole 120 is less than the lateral dimension, $D_L$, irrespective of the shape of the opening defined by the upstream dilution air admission holes 116. The number of quench air holes provided in the circumferential row of quench air admission holes 120 disposed downstream of the circumferential row of dilution air admission holes 116 depends upon the spacing between the large dilution air holes 120. As a general guideline, the number of quench air holes 120 is proportional to the lateral spacing, $S_L$, between the relatively larger dilution air admission holes 116, expressed as the number of equivalent distances, $D_L$, minus 1. For example, if the dilution air admission holes 116 are spaced two diameters apart, then the number of quench air admission holes 120 is equals the number of dilution air admission holes 116 in the row upstream thereof. If the dilution air admission holes 116 are spaced three diameters apart, then the number of quench air admission holes 120 is equals twice the number of dilution air admission holes 116 in the row upstream thereof. If the dilution air admission holes 116 are spaced four diameters apart, then the number of quench air admission holes 120 is equals three times the number of dilution air admission holes 116 in the row upstream thereof, and so on.

Referring now to the embodiments depicted in FIGS. 6-9 in particular, each of the plurality of relatively large dilution air admission holes 116 formed in the inner and outer liners comprises a circular hole having a diameter, $D_L$, and each of the plurality of quench air admission holes 120 comprises a circular hole having a second diameter, $D_Q$, being about ⅓ of the diameter, $D_L$. In each embodiment, a first and a second quench air admission hole 120 is arranged in the circumferential row of quench air admission holes 120 in association with a respective one of the plurality of relatively large dilution air admission holes 116 in the upstream row of dilution air admission holes. The respective centers of the set of first and second quench air admission holes and of the associated dilution air admission hole 116 form an isosceles triangle with the center of the larger diameter air admission hole disposed at the apex and the centers of the first and second quench air admission holes the respective base corners of the triangle. In the depicted configurations in FIGS. 6-9, the circumferential row of quench air admission holes is disposed axially downstream of the circumferential row of dilution air admission holes by a distance, $S_A$, equal to about seven tenths of the first diameter, $D_L$. It is to be understood, however, that in other configurations, the circumferential row of quench air admission holes 120 may be disposed downstream of the row of dilution air admission holes by a distance, $S_A$, ranging from about one-half the diameter, $D_L$, up to about one diameter, $D_L$.

The lateral distance, $S_C$, by which each first quench air admission hole 120 is laterally offset, center-to-center, from the associated dilution air admission hole and the lateral distance, $S_C$, by which each second quench air admission hole is laterally offset from the associated larger diameter dilution air admission are equal. The magnitude of the lateral offset may range from about one-half the diameter, $D_L$, up to about one diameter, $D_L$. In the configuration depicted in FIG. 6, the large diameter dilution air holes 116 are spaced apart, center-to-center, by a distance $S_L$ equal to twice the diameter $D_L$, and the quench air admission holes are offset laterally, center-to-center, a lateral spacing equal to the diameter $D_L$. In the configuration depicted in FIG. 7, the large diameter dilution air holes 116 are spaced apart, center-to-center, by a distance $S_L$ equal to about 2.3 times the diameter $D_L$, and the quench air admission holes are offset laterally, center-to-center, a lateral spacing equal to about seven-tenths of the diameter $D_L$. In the configurations depicted in FIGS. 8 and 9, the large diameter dilution air holes 116 are spaced apart, center-to-center, by a distance $S_L$ equal to about four times the diameter $D_L$, and the quench air admission holes are offset laterally, center-to-center, a lateral spacing equal to about seven-tenths of the diameter $D_L$. Additionally, in the FIG. 8 embodiment, a plurality of second quench air admission holes 121 may be interspersed amongst the quench air admission holes 120 in the row of quench air admission holes. Unlike the first quench air admission holes 120, the second quench air admission holes 121 are not associated with a particular large diameter dilution air admission hole 116, but are spaced between sets of first quench air admission holes 120 to quench hot spots that may develop between relatively widely spaced large diameter dilution air admission holes 116. In the embodiment depicted in FIG. 9, no second quench air admission holes 121 are included in the row of quench air admission holes, because of the presence of a plurality of small diameter dilution air admission holes 118 located between neighboring larger diameter air admission holes 116 in the upstream circumferential row of dilution air admission holes.

In the embodiment depicted in FIG. 10, the plurality of dilution air admission holes 116 comprise a plurality of axially elongated generally elliptical holes, each hole defining an elliptical opening having a lateral axis, $D_L$, and an axial axis, $D_A$. The lateral axis, $D_L$, constitutes the minor axis of the elliptical opening and the axial axis, $D_A$, constitutes the major axis of the elliptical opening defined by the dilution air admission holes 116. Each of the quench air admission holes disposed in the circumferential row of quench air admission holes 120 disposed downstream of the circumferential row of elliptical dilution air admission holes 116 comprises a circular hole having a diameter, $D_Q$. The diameter, $D_Q$, has a magnitude lying in the range from about 0.25 to about 0.40 of the lateral axis, $D_L$, of the elliptical dilution air admission holes 116. The circumferential row of quench air admission holes 120 is disposed axially downstream of the circumferential row of elliptical dilution air admission holes 116 by a center-to-center spacing, $S_A$, ranging from about 0.7 to about 1.0 times $D_A$. In the configuration depicted in FIG. 10, the spacing $S_A$ is about 0.7 of the axial axis, i.e. the major axis, $D_A$, of the dilution air admission hole. The lateral distance, $S_C$, by which each a first quench air admission hole 120 is laterally offset, center-to-center, from the associated dilution air admission hole 116 and the lateral distance, $S_C$, by which a second quench air admission hole 120 is offset from the associated first dilution air admission hole 116 are equal and have a magnitude lying in the range from about 0.5 to about 0.9 of the lateral axis, i.e. the minor axis, $D_L$, of the associated elliptical dilution air admission hole 116. In the depicted configuration depicted in FIG. 10, the lateral offset spacing, $S_L$, has a magnitude of about 0.7 of the lateral axis, $D_L$. Additionally, as in the FIG. 8 configuration, due to the relatively wide spacing, $S_L$, between the elliptical dilution air admission holes 116 in FIG. 10, a plurality of second quench air admission holes 121 may be interspersed amongst the quench air admission holes 120 in the row of quench air admission holes. The second quench air admission holes 121 are not associated with a particular elliptical dilution air admission hole 116, but are spaced between sets of first quench air admission holes 120 to quench hot spots that may develop between relatively widely spaced large diameter dilution air admission holes 116.

The application of quench air admission into the "hot spot" wake zones and "hot streak" zones that may be formed in the combustion chamber 30 downstream with respect to gas flow of the dilution air admission holes 116 has been disclosed and described hereinbefore with reference to an exemplary embodiment of gas turbine combustor having an inner and outer annular liner of double wall construction. It is to be understood, however, that quench air admission in accordance with the teachings of this disclosure and as described herein may be applied as well to combustion chambers having single wall liners.

In such double wall construction, each quench air admission hole 120, like the dilution air admission holes 116, includes a respective hole 120 in the support shell 44, 58 of each of the inner and outer liners 32, 34 and a corresponding hole 120 in the associated heat shield 48, 62, as best illustrated in FIG. 4. The respective holes in the outer support shells are slightly larger than their corresponding counterparts in the inner heat shields. For example, for a liner having large circular dilution air admission holes 116, the diameter of those dilution air admission holes in the support shell might be about 0.75 inches and the diameter of the associated quench air admission holes 120 therein might be about 0.25 inches, while the diameter of the corresponding dilution air admission holes in the inner heat shield might be about 0.67 inches and the diameter of the associated quench air admission holes might be about 0.175 inches.

As noted previously, the inner liner 32 and the outer liner 34 forming the liner assembly of the annular combustor 26 are each constructed of a circumferential array of liner panels. Each panel has a longitudinal expanse in the axial direction and a lateral expanse in the circumferential direction. Each panel has at least one relatively larger first dilution air admission hole 116 and at least one of the pair of quench air admission holes 120 associated with that dilution air admission hole and laid-out in one of the patterns shown in FIGS. 6-10. Depending upon the lateral expanse of the panel, the positioning of the of the relatively larger first dilution air admission hole 116 therein, and the offset spacing of the quench air admission holes 120 with respect to that dilution air admission hole 116, both quench air admission holes 120 of the pair associated with that dilution air admission hole and laid-out in one of the patterns shown in FIGS. 6-10 may be present in an individual liner panel.

While the present invention has been particularly shown and described with reference to the depicted embodiment as illustrated in the drawing, it will be understood by one skilled in the art that various changes in detail may be effected therein without departing from the spirit and scope of the invention. The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention as defined by the claims.

We claim:

1. An annular combustor for a gas turbine engine, comprising:
   a first annular liner extending along a longitudinal axis;
   a second annular liner spaced radially outboard of and generally coaxially circumscribing the first liner, each of the first annular liner and the second annular liner having a heat shield mounted to a shell;
   a bulkhead extending between a forward end of the first liner and a forward end of the second liner and cooperating therewith to define a combustion chamber for combusting fuel in air;
   a plurality of first dilution air admission holes formed in the first annular liner and arranged in a circumferential row at circumferentially spaced intervals;
   a plurality of first dilution air admission holes formed in the second annular liner and arranged in a circumferential row at circumferentially spaced intervals; and
   a plurality of quench air admission holes formed in at least one of the first and the second annular liners, said plurality of quench air admission holes being arranged in a circumferential row disposed downstream of the plurality of first dilution air holes and offset circumferentially from the plurality of dilution air holes disposed upstream thereof, each of said plurality of quench air admission holes including a respective hole in the shell and a corresponding hole in the heat shield of said at least one of the first and the second annular liners.

2. The annular combustor for a gas turbine as recited in claim 1 wherein the plurality of quench air admission holes are arranged with respect to the plurality of first dilution air admission holes disposed upstream thereof such that there is associated with each first dilution air admission hole a first quench air admission hole and a second quench air hole, the first quench air hole being offset laterally from said associated first dilution air admission hole in a first lateral direction by a first circumferential distance and the second quench air hole being offset laterally from said associated first dilution air admission hole in a second lateral direction opposite to the first direction by a second circumferential distance.

3. The annular combustor for a gas turbine as recited in claim 2 wherein the first circumferential distance and the second circumferential distance are substantially the same.

4. The annular combustor for a gas turbine engine as recited in claim 3 wherein each first dilution air admission hole in said first and second annular liners defines an opening having a second air flow area, each of the quench air admission holes in said at least one of the first and second annular liners defines an opening having a first air flow area and, the first air flow area being smaller the second air flow area.

5. The annular combustor for a gas turbine engine as recited in claim 2 wherein each first dilution air admission hole defines an opening having a lateral dimension, $D_L$, and each quench air admission hole defines an opening having a lateral dimension, $D_Q$, the lateral dimension $D_Q$, being less than the lateral dimension, $D_L$.

6. The annular combustor for a gas turbine engine as recited in claim 2 wherein the plurality of first dilution air admission holes formed in said at least one of the first and second annular liners comprise a plurality of circular holes having a first diameter, $D_L$, and said plurality of quench air admission holes comprises a plurality of circular holes having a second diameter, $D_Q$, the second diameter, $D_Q$, being about ⅓ of the first diameter, $D_L$.

7. The annular combustor for a gas turbine engine as recited in claim 6 wherein the circumferential row of quench air admission holes is disposed axially downstream of the circumferential row of first dilution air admission holes by a distance, $S_A$, ranging from about one-half the first diameter, $D_L$, up to about one first diameter, $D_L$.

8. The annular combustor for a gas turbine engine as recited in claim 7 wherein the circumferential row of quench air admission holes is disposed axially downstream of the circumferential row of first dilution air admission holes by a distance, $S_A$, substantially equal to about seven tenths of the first diameter, $D_L$.

9. The annular combustor for a gas turbine engine as recited in claim 6 wherein the first lateral distance by which each first quench air admission hole is laterally offset from the associated first dilution air admission and the second lateral distance by which each second quench air admission hole is laterally offset from the associated first dilution air admission are equal and have a magnitude about equal to the first diameter, $D_L$.

10. The annular combustor for a gas turbine engine as recited in claim 2 wherein the plurality of dilution air admission holes formed in said at least one of the first and second annular liners comprise a plurality of axially elongated generally elliptical holes having a lateral axis, $D_L$, and said plurality of quench air holes comprises a plurality of circular holes having a second diameter, the second diameter, $D_Q$, having a magnitude lying in the range from about 0.25 to about 0.40 of the first diameter, $D_L$.

11. The annular combustor for a gas turbine engine as recited in claim 10 wherein the circumferential row of quench air admission holes is disposed axially downstream of the circumferential row of dilution elliptical first air admission holes by a center-to-center spacing, $S_A$, ranging from about 1.5 to about 2.0 times $D_L$.

12. The annular combustor for a gas turbine engine as recited in claim 10 wherein the first lateral distance by which each first quench air admission hole is offset from the associated first dilution air admission and the second lateral distance by which each second quench air admission hole is offset from the associated first dilution air admission are equal and have a magnitude lying in the range from about 0.5 to about 0.9 of the lateral axis, $D_L$, of the associated elliptical dilution air admission hole.

13. A method for controlling temperature deviations in the exhaust gases exiting an annular combustion chamber defined between an inner circumferentially extending liner and an outer circumferentially extending liner spaced radially outboard of and coaxially circumscribing the inner liner, each of the inner circumferentially extending liner and the outer circumferentially extending liner having a heat shield mounted to a shell, wherein combustion dilution air is admitted into the combustion chamber through a plurality of relatively large dilution air admission holes disposed in a circumferentially extending row in each of the inner liner and the outer liner; the method comprising the steps of:

providing a plurality of relatively smaller quench air admission holes in a circumferential row in at least one of the inner and outer liners at a location downstream of the row of relatively large dilution air admission holes, each of said plurality of relatively smaller quench air admission holes including a respective hole in the shell and a corresponding hole in the heat shield of said at least one of the inner and outer liners;

arranging the plurality of relatively smaller quench air admission holes relative to the plurality of relatively large dilution air admission holes upstream thereof such that there is associated with each relatively large dilution air admission hole a first quench air admission hole and second quench air admission hole, the first quench air admission hole and a second quench air admission hole, the first quench air admission hole being offset laterally in a first lateral direction and the second quench air admission hole being offset laterally in a second lateral direction opposite to the first direction; and admitting quench air into the combustion chamber through said plurality of quench air admission holes.

14. The method as recited in claim 13 further comprising the step of offsetting the first quench air admission hole laterally in a first lateral direction by a first circumferential distance and offsetting the second quench air admission hole laterally in a second lateral direction opposite to the first direction by a second circumferential distance, the first circumferential distance and the second circumferential distance being equal.

15. The method as recited in claim 13 wherein each dilution air admission hole defines an opening having a lateral dimension, $D_L$, and each quench air admission hole defines an opening having a lateral dimension, $D_Q$, the lateral dimension, $D_Q$, being less than the lateral dimension, $D_L$.

16. The method as recited in claim 13 wherein the step of providing a plurality of relatively smaller quench air admission holes in a circumferential row in at least one of the inner and outer liners at a location downstream of the row of relatively large dilution air admission holes comprises disposing the circumferential row of quench air admission holes axially downstream of a circumferential row of circular first dilution air admission holes having a diameter, $D_L$, by a distance, $S_A$, ranging from about one-half the first diameter, $D_L$, up to about one first diameter, $D_L$.

17. The method as recited in claim 13 wherein the step of providing a plurality of relatively smaller quench air admission holes in a circumferential row in at least one of the inner and outer liners at a location downstream of the row of relatively large dilution air admission holes comprises disposing the circumferential row of quench air admission holes downstream of a circumferential row of generally elliptical first dilution air admission holes having a lateral dimension, $D_L$, by a distance, $S_A$, ranging from about 1.5 the lateral dimension, $D_L$, up to about one twice the lateral dimension, $D_L$.

18. A liner panel for an annular liner of a gas turbine engine combustor, the liner panel having a heat shield mounted to a shell, the liner panel having a longitudinal expanse and a lateral expanse and comprising:

at least one relatively larger dilution air admission hole passing therethrough; and at least one relatively smaller diameter quench air admission hole passing therethrough, the at least one quench air admission hole being disposed downstream of and offset circumferentially from the at least one dilution air admission hole, the at least one quench air admission hole including a respective hole in the shell and a corresponding hole in the heat shield.

19. The liner panel as set forth in claim 18 further comprising a second relatively smaller quench air admission hole passing therethrough, said second quench air admission hole being disposed downstream of the at least one dilution air admission hole in a circumferential row with said at least one quench air admission hole and being equally offset laterally from the least at least one dilution air admission hole as the at least one quench air admission hole in a lateral direction opposite to said at least one quench air admission hole.

20. The annular combustor for a gas turbine engine as recited in claim 1, wherein the respective holes in the shell are slightly larger than the corresponding holes in the heat shield.

* * * * *